(12) United States Patent
Chang

(10) Patent No.: US 7,663,812 B2
(45) Date of Patent: Feb. 16, 2010

(54) LENS MODULE WITH SPACER

(75) Inventor: Keng-Ming Chang, Taipei Hsien (TW)

(73) Assignee: Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 0 days.

(21) Appl. No.: 12/257,256

(22) Filed: Oct. 23, 2008

(65) Prior Publication Data
US 2009/0316282 A1 Dec. 24, 2009

(30) Foreign Application Priority Data
Jun. 24, 2008 (CN) .................. 2008 1 0302290

(51) Int. Cl.
*G02B 9/08* (2006.01)
(52) U.S. Cl. .................. 359/740; 359/738; 359/739; 359/793; 359/796; 359/830
(58) Field of Classification Search ......... 359/738–740, 359/793, 796, 830
See application file for complete search history.

(56) References Cited

U.S. PATENT DOCUMENTS

| | | | | |
|---|---|---|---|---|
| 4,886,342 A | * | 12/1989 | Kudo et al. .................. 359/738 |
| 5,117,311 A | * | 5/1992 | Nomura ....................... 359/830 |
| 5,488,514 A | * | 1/1996 | Bruning et al. ............. 359/830 |
| 5,691,853 A | * | 11/1997 | Miyano ....................... 359/740 |
| 6,341,901 B1 | * | 1/2002 | Iwasa et al. .................. 359/740 |
| 6,898,030 B1 | * | 5/2005 | Lin et al. .................... 359/740 |

FOREIGN PATENT DOCUMENTS

| | | | | |
|---|---|---|---|---|
| JP | 3-61005214 A | * | 1/1986 | ................. 359/830 |
| JP | 4-02093508 A | * | 4/1990 | ................. 359/830 |

* cited by examiner

*Primary Examiner*—Evelyn A. Lester
(74) *Attorney, Agent, or Firm*—Andrew C. Cheng

(57) ABSTRACT

A lens module comprises a first lens, a second lens, a spacer, an adhesive and a lens barrel. The spacer is sandwiched between the first lens and the second lens, and includes a first surface, an opposite second surface, a lateral surface, a through hole and a plurality of cutouts. The lateral surface interconnects the first surface and the second surface. The through hole is defined in a central portion of the spacer. The cutouts are defined in the lateral surface. The adhesive is applied in the cutouts and interconnects the first lens with the second lens. The lens barrel receives the first lens, the second lens, the adhesive and the spacer therein.

10 Claims, 4 Drawing Sheets

LENS MODULE WITH SPACER

BACKGROUND

1. Technical Field

The present disclosure relates to optical imaging devices and, particularly, to a lens module with a spacer.

2. Description of Related Art

With the development of optical imaging technology, portable electronic devices equipped with digital camera module, such as mobile phones and personal digital assistants (PDAs), have become increasingly popular. Recently, the developing trend of portable electronic devices are becoming lighter, thinner, shorter and smaller; therefore, digital camera modules inside the portable electronic devices are becoming smaller and smaller. A digital camera module includes a barrel and a number of optical elements (e.g. lenses, spacers, filters) received in the barrel. In order to miniaturize the digital camera modules, sizes of the optical elements are required to be miniaturized accordingly.

During the assembling process of the digital camera module, the lenses and the spacers between two lenses are assembled into a barrel one by one. However, the lateral surfaces of each lens and each spacer assembled into the barrel are respectively fixed to an inner wall of the barrel by use of adhesive. More lenses and spacers would need more adhesive which occupy more space in the barrel. Therefore, the barrel must provide an extra-space to receive the adhesive. As a result, it is difficult to miniaturize the digital camera module according to the above-mentioned fact.

What is need, therefore, a lens module with a spacer are desired to overcome the above mentioned problems.

SUMMARY

An exemplary lens module comprises a first lens, a second lens, a spacer, an adhesive and a lens barrel. The spacer is sandwiched between the first lens and the second lens, and includes a first surface, an opposite second surface, a lateral surface, a through hole and a plurality of cutouts. The lateral surface interconnects the first surface and the second surface. The through hole is defined in a central portion of the spacer. The cutouts are defined in the lateral surface. The adhesive is applied in the cutouts and interconnects the first lens with the second lens. The lens barrel receives the first lens, the second lens, the adhesive and the spacer therein.

BRIEF DESCRIPTION OF THE DRAWINGS

The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Reference will now be made to the drawings to describe in detail an embodiment of the present spacer, lens group and lens module.

Figure 1:
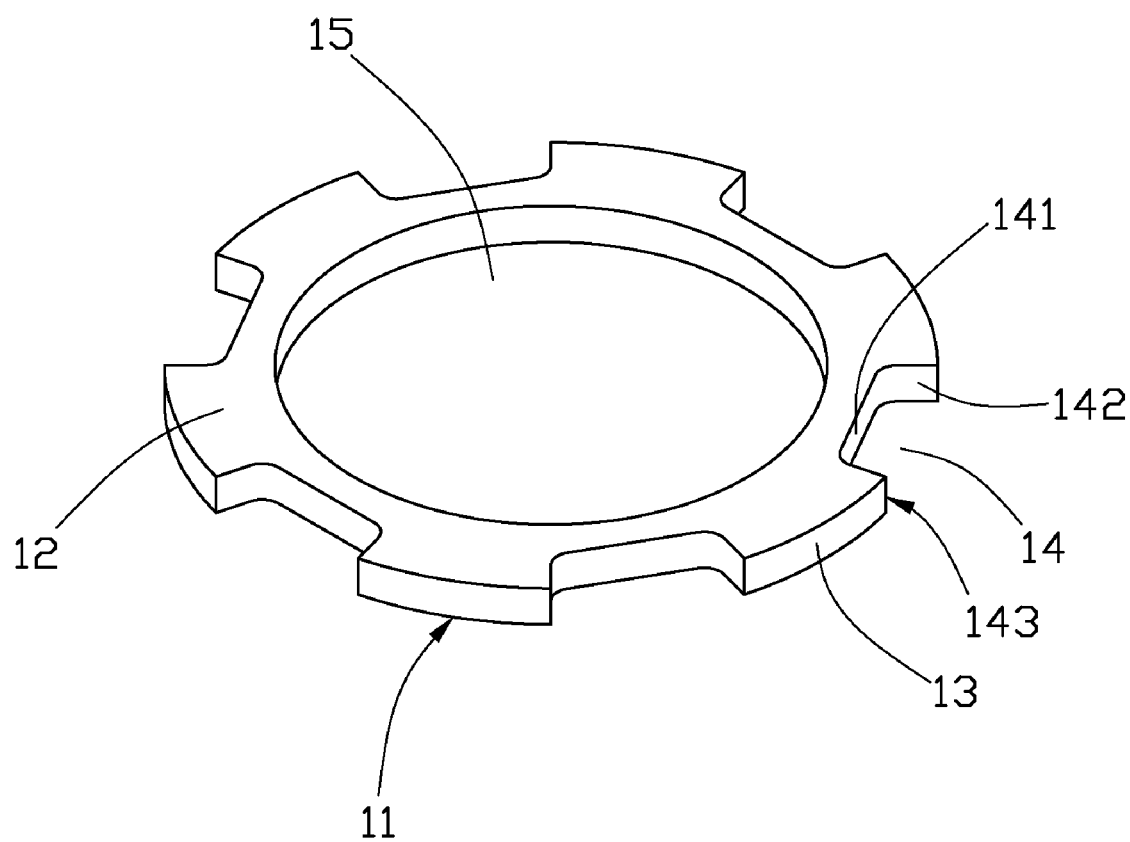
FIG. 1 is a schematic view of a spacer, according to a first embodiment.

Referring to FIG. 1, a spacer 10 in accordance with a first embodiment, is shown. The spacer 10 can be made of black resin or other opaque materials. The spacer 10 has an annular body that has a first surface 11, a second surface 12 opposite to the first surface 11 and a lateral surface 13. The lateral surface 13 joins the first surface 11 and the second surface 12.

The annular body of the spacer 10 has a through hole 15 which is defined at a central portion and extends through the first surface 11 and the second surface 12, to allow light to travel therethrough, and a plurality of cutouts 14 defined in the lateral surface 13 along a circumference of the spacer 10. In the present embodiment, each of the cutouts 14 runs from the first surface 11 to the second surface 12.

The spacer 10 has a first bonding surface 141, a second bonding surface 142, and a third bonding surface 143 facing the second bonding surface 142 in each of the cutouts 14. The first bonding surface 141 faces outwardly and joins the second bonding surface 142 and the first bonding surface 141. In the present embodiment, the first bonding surface 141 is parallel with the central axis of the spacer 10. The spacer 10 can be adhered to a barrel by use of an ultraviolet curing adhesive. Wherein, the ultraviolet curing adhesive is applied in the cutouts 14 and contacts both the first bonding surface 141 and an inner wall (not labeled) of the barrel.

In the present embodiment, the spacer 10 is circular and defines six cutouts 14. The six cutouts 14 are distributed at equal interval along a circumference of the spacer 10. The depth of each of the cutouts 14 can vary according to need. For example, the depth could be in a range from about 0.1 millimeters to about 0.2 millimeters.

Figure 2:
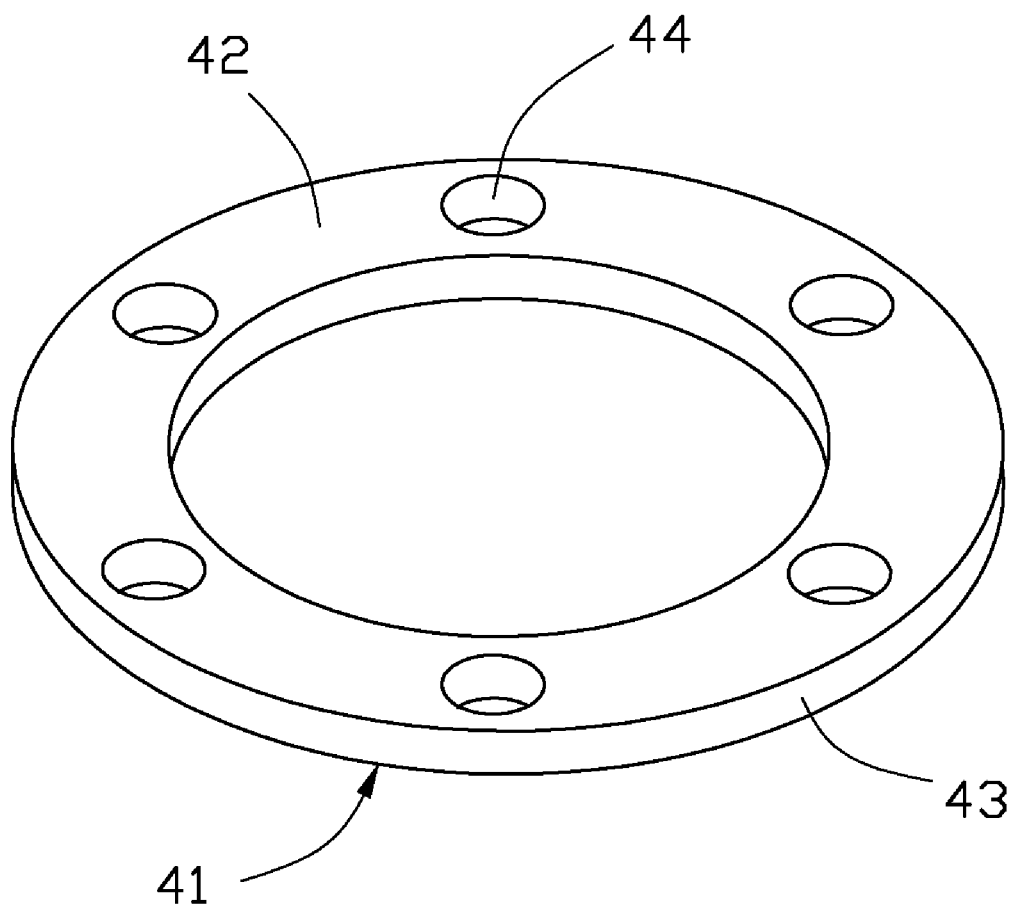
FIG. 2 is a schematic view of a spacer, according to a second embodiment.

Referring to FIG. 2, a spacer 40 in accordance with a second embodiment, is shown. The structure of spacer 40 is similar to the spacer 10 of the first embodiment, except that the spacer 40 has a plurality of peripheral through holes 44. In the present embodiment, the spacer 40 includes an annular body which has a first surface 41, a second surface 42 opposite to the first surface 41, and a lateral surface 43 connecting the first and second surfaces 41, 42. The peripheral through holes 44 are defined in the annular body through the first and second surfaces 41, 42 and surrounding the central through hole (not labeled). Each of the peripheral through holes 44 is spaced a distance from the lateral surface 43. In the present embodiment, the peripheral through holes 44 are distributed at equal interval along a circumference of the spacer 40.

Figure 3:
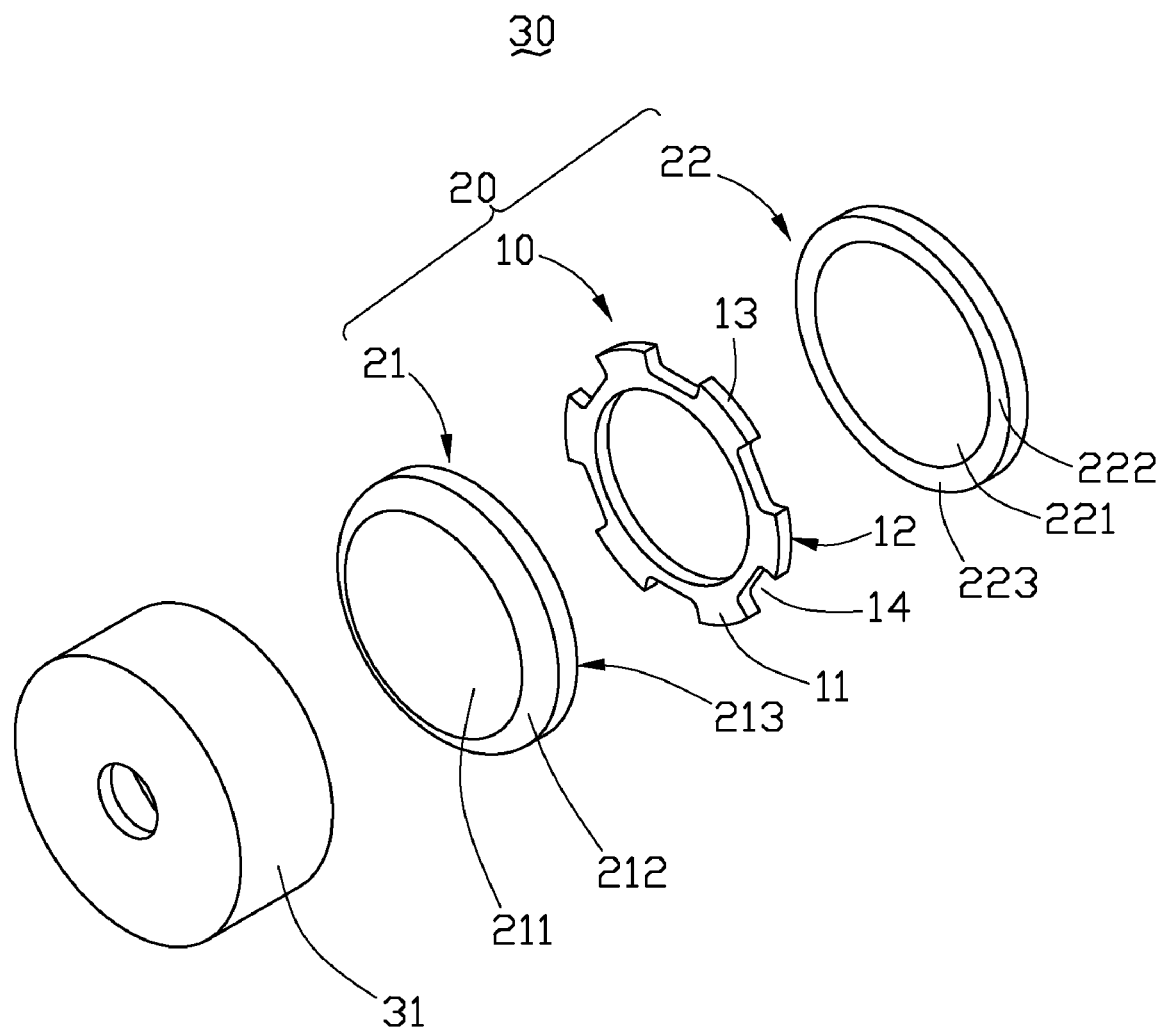
FIG. 3 is a schematic, exploded view of a lens module, according to a further embodiment.
Figure 4:
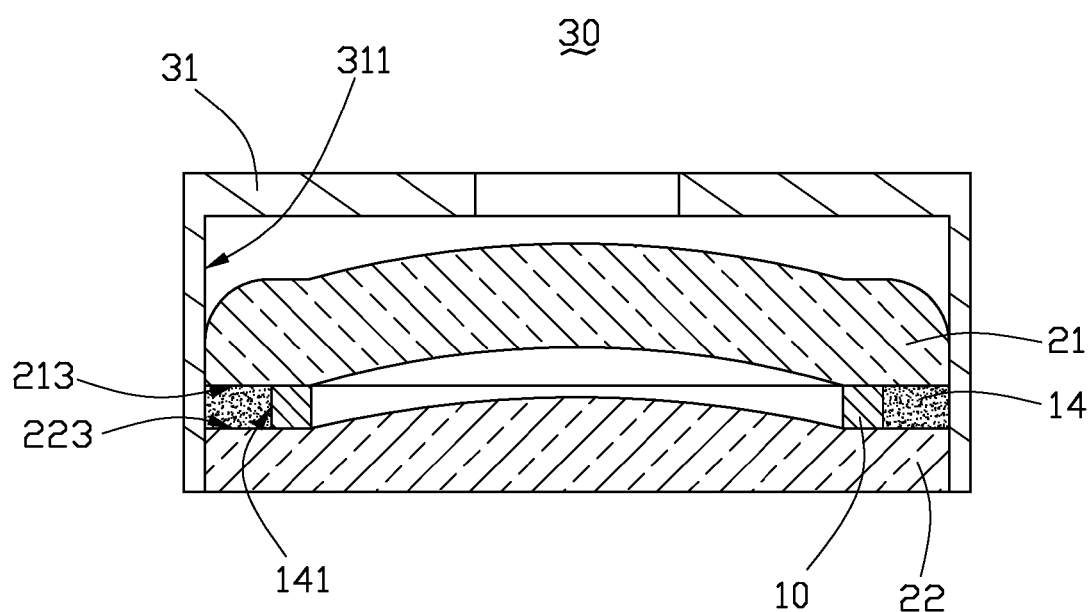
FIG. 4 is a schematic, cross-sectional view of a lens module, according to an embodiment.

Referring to FIG. 3 and FIG. 4, a lens module 30 incorporating the above-described spacer 10 is shown. The lens module 30 includes a barrel 31 and a lens group 20. The lens group 20 is installed in the barrel 31 along an optical axis of the barrel 31.

The lens group 20 includes a first lens 21, a second lens 22 and the spacer 10. The spacer 10 is sandwiched between the first lens 21 and the second lens 22.

The first lens 21 includes a first central round portion 211 and a first radially extending portion part 212 surrounding the first central round portion 211. The first central round portion 211 corresponds to the through hole 15 (see FIG. 1) of the spacer 10. The first radially extending portion 212 has a first fixing surface 213 corresponding to the first surface 11 of the spacer 10. The first fixing surface 213 is configured for binding with the first surface 11 during assembling the lens group 20.

The second lens 22 includes a second central round portion 221 and a second radially extending portion 222. The second central round portion 221 and the first central round portion 211 have a common optical axis. The second radially extending portion 222 surrounding the second central round portion 221 has a second fixing surface 223 corresponding to the second surface 12 of the spacer 10. The second fixing surface 223 is configured for binding with the second surface 12 during assembling the lens group 20.

In assembling of the lens group 20, the first lens 21 and the second lens 22 are aligned and attached to opposite sides of the spacer 10, such that the first fixing surface 213 and the second fixing surface 223 respectively covers opposite sides of each cutout 14. Then an adhesive is applied in the cutouts 14, extends from the first surface 11 of the spacer 10 to the second surface 12 thereof, and is configured to binding the first lens 21 and the second lens 22. The adhesive can be solidified with ultraviolet radiation, therefore, the first lens 21, the second lens 22 and the spacer 10 are bonded together, and the lens group 20 is obtained.

In present embodiment, an inner diameter of the spacer 10 is equal to or slightly smaller than a diameter of the first central round portion 211, or a diameter of the second central round portion 221 so as to prevent stray light from entering into the lens group 20.

Referring to FIG. 4, the barrel 31 has an inner surface 311 opposite to the first bonding surface 141 of the spacer 10.

There are two methods for assembling the lens module 30. In one method, the assembled lens group 20 is arranged in the barrel 31, then, an adhesive is applied between the lens group 20 and the inner surface 311 of the barrel 31.

In another method, firstly, the first lens 21 is fixed in the barrel 31. Secondly, the spacer 10 is placed on the first lens 21, and the first surface 11 contacts the first fixing surface 213. Thirdly, an adhesive is injected into and fills the cutouts 14. That is, the adhesive respectively contacts the first bonding surface 141, the second bonding surface 142, the third bonding surface 143 of the cutouts 14, and a portion of the inner surface 311 of the barrel 31. Fourthly, the second lens 23 is arranged in the barrel 31 and placed on the spacer 10, and the second fixing surface 223 contacts the second surface 12. Meanwhile, the adhesive received the cutouts 14 is in contact with a portion of the second fixing surface 223 corresponding to the cutouts 14. Finally, the adhesive is cured with ultraviolet radiation. The portions of the first and second fixing surfaces 213, 223, the inner surface 311 corresponding to the cutouts 14, the first bonding surface 141, the second bonding surface 142 and the third bonding surface 143 are bonded together. Thus, the first lens 21, the second lens 22, the spacer 10 and the barrel 30 are bonded together, as shown in FIG. 4. Therefore, the spacer 10 including the cutouts 14 configured for receiving the adhesive, can effectively reduce binding times and improves binding force between the elements.

It is understood that the spacer 40 of the second embodiment can also be employed in the lenses group 20 as a substitute for the spacer 10.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope of the appended claims.

What is claimed is:

1. A lens module comprising:
a first lens;
a second lens;
a spacer sandwiched between the first lens and the second lens; the spacer comprising,
a first surface;
an opposite second surface;
a lateral surface interconnecting the first surface and the second surface;
a through hole defined in a central portion thereof, and
a plurality of cutouts defined in the lateral surface;
an adhesive applied in the cutouts and interconnecting the first lens with the second lens; and
a lens barrel receiving the first lens, the second lens, the adhesive and the spacer therein.

2. The lens module as claimed in claim 1, wherein the adhesive extends from the first surface of the spacer to the second surface thereof.

3. The lens module as claimed in claim 1, wherein the spacer has a first bonding surface facing outwardly in each cutout and the first bonding surface is parallel with the central axis of the spacer.

4. The lens module as claimed in claim 1, wherein the spacer is circular, and the cutouts are spaced from each other along a circumference of the spacer.

5. The lens module as claimed in claim 1, wherein the cutouts are equidistantly distributed along a circumference of the spacer.

6. The lens module as claimed in claim 1, wherein the depth of each cutout in a radius direction of the spacer is in a range from 0.1 millimeter to 0.2 millimeter.

7. A lens module comprising:
a first lens;
a second lens;
a spacer sandwiched between the first lens and the second lens; the spacer comprising
a first surface;
an opposite second surface;
a lateral surface interconnecting the first surface and the second surface;
a central through hole defined in a central portion thereof, and
a plurality of peripheral through holes defined therein, the peripheral through holes surrounding the central through hole;
an adhesive applied in the peripheral through holes and interconnecting the first lens with the second lens; and
a lens barrel receiving the first lens, the second lens, the adhesive and the spacer therein.

8. The lens module as claimed in claim 7, wherein each peripheral through hole is spaced a distance from the lateral surface.

9. The lens module as claimed in claim 7, wherein the peripheral through holes are spaced from each other along a circumference of the spacer.

10. The lens module as claimed in claim 7, wherein the peripheral through holes are equidistantly spaced.

* * * * *